E. T. CARLISLE.
DETACHABLE SLEIGH RUNNER.
APPLICATION FILED JUNE 23, 1916.
1,207,856.  Patented Dec. 12, 1916.
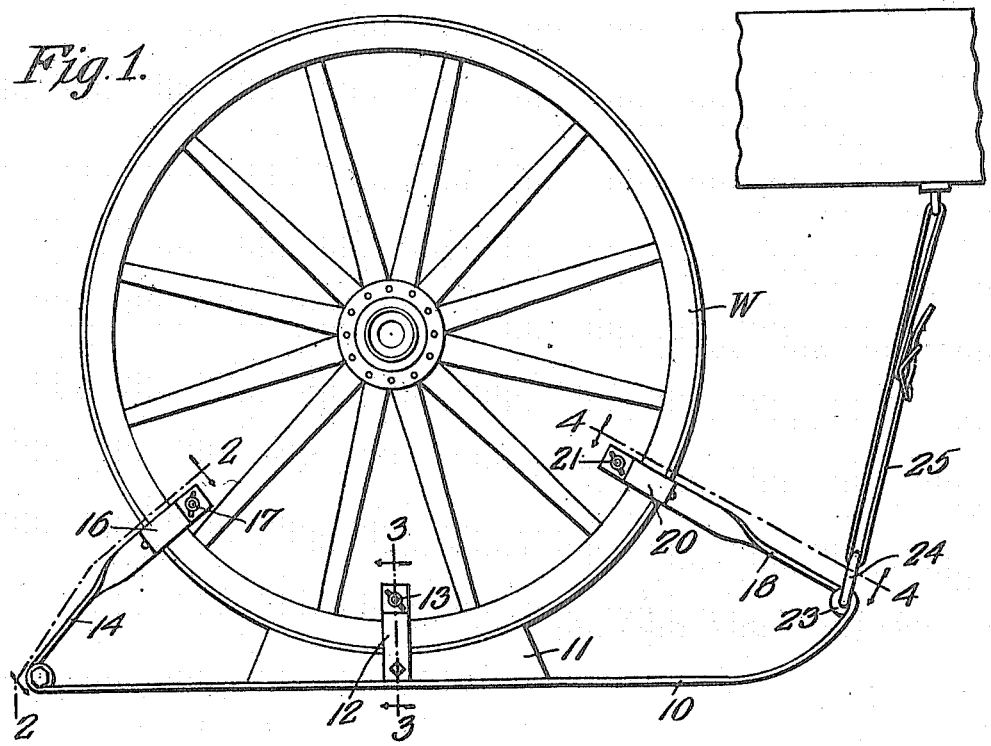
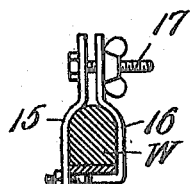
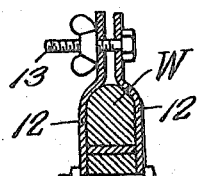
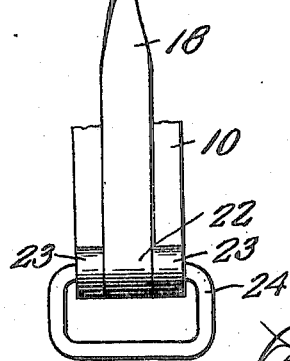
Inventor
E. T. Carlisle,

UNITED STATES PATENT OFFICE.

ERNEST T. CARLISLE, OF LIVINGSTON, MONTANA.

DETACHABLE SLEIGH-RUNNER.

1,207,856.

Specification of Letters Patent.    Patented Dec. 12, 1916.

Application filed June 23, 1916.   Serial No. 105,429.

*To all whom it may concern:*

Be it known that I, ERNEST T. CARLISLE, a citizen of the United States, residing at Livingston, in the county of Park, State of Montana, have invented certain new and useful Improvements in Detachable Sleigh-Runners; and I do hereby declare the following to be a full, clear, and exact description of the invention, such as will enable others skilled in the art to which it appertains to make and use the same.

This invention relates to vehicles and has special reference to a detachable runner for wheels arranged to convert a wheeled vehicle into a sleigh.

One important object of the invention is to provide an improved and simplified general construction of devices of this character.

A second important object of the invention is to provide an improved means for connecting the device to the body of the vehicle to prevent buckling.

A third important object of the invention is to provide an improved connection for the runner, its forward brace, and its attachment to the vehicle.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and Figure 1 is a side elevation of a wheel with the improved runner attached thereto. Fig. 2 is a section on the line 2—2 of the wheel showing the rear brace of the runner in elevation. Fig. 3 is a section on the line 3—3 of Fig. 1. Fig. 4 is a section on the line 4—4 of Fig. 1, with the front attaching strap omitted.

In carrying out the objects of this invention there is provided a runner 10 which is preferably made of steel or other like material and located on top of this runner between the ends thereof is a block 11 concaved on its upper side to fit the rim of the wheel "W". This block is secured to the wheel rim by means of clamps 12 curved to fit the wheel rim and held together by a bolt 13. At the rear of the runner there is hinged a rear brace member 14 which carries on its free end a clamping member 15 coöperating with a second clamping member 16 hinged to the clamping member 15 as shown. These members 15 and 16 are drawn together around the rim of the wheel by means of a suitable bolt 17.

At the front end of the runner there is provided a similar front brace 18 having on its free end a clamping member 19 associated with a second hinged clamping member 20, the wheel rim being received between the two members 19 and 20 and held therein by means of a bolt 21 which draws the two clamping members together. This front brace 18 is provided with a hinge eye 22 which fits between a pair of hinge eyes 23 formed on the front of the runner. Through the eyes 22 and 23 passes a hinge pintle which is preferably in the form of a link, one side of the link forming the pivot for the hinge while the other side is spaced from the brace and the end of the runner. Engaged in the link 24 is a strap or chain 25 by means of which the forward end of the runner may be connected to the body of the vehicle, as shown. It will be observed that by this construction the braces, when disconnected, can be folded down on the body of the runner so that the device occupies very little space and that the vehicle can be quickly converted from a wheeled vehicle to a sleigh or vice versa.

It is also to be noted that the peculiar construction of the hinge at the front of the runner is such as to bring the pull of the strap 25 directly on the hinge so that both the front brace and the runner are drawn upon at times when the front end of the runner tends to tilt downward, this affording an economical and strong construction for this part.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

In a device of the class described, a sleigh runner, wheel securing means on said runner, hinge eyes formed on the front end of the runner, a front brace provided with a hinge eye fitting between the eyes on the front of the runner, clamping means carried by the front brace for attachment to the rim of a wheel and a link having one side extending through the hinge eyes and adapted to receive a brace strap for attachment of the front end of the runner to the body of a vehicle.

In testimony whereof, I affix my signature, in the presence of two witnesses.

ERNEST T. CARLISLE.

Witnesses:
 RUSSEL H. PERRY,
 DAN J. FRASER.

Copies of this patent may be obtained for five cents each, by addressing the "Commissioner of Patents. Washington, D. C."